United States Patent
De Vries et al.

(10) Patent No.: US 7,107,432 B2
(45) Date of Patent: Sep. 12, 2006

(54) VLIW PROCESSOR WITH DATA SPILLING MEANS

(75) Inventors: Tromp Johannes De Vries, Eindhoven (NL); Marco Jan Gerrit Bekooij, Eindhoven (NL); Alexander Augusteijn, Eindhoven (NL); Johan Sebastiaan Henri Van Gageldonk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 209 days.

(21) Appl. No.: 10/511,208

(22) PCT Filed: Apr. 1, 2003

(86) PCT No.: PCT/IB03/01364

§ 371 (c)(1),
(2), (4) Date: Oct. 13, 2004

(87) PCT Pub. No.: WO03/088037

PCT Pub. Date: Oct. 23, 2003

(65) Prior Publication Data

US 2005/0144424 A1 Jun. 30, 2005

(30) Foreign Application Priority Data

Apr. 18, 2002 (EP) ................... 02076524

(51) Int. Cl.
*G06F 9/312* (2006.01)
*G06F 15/80* (2006.01)
(52) U.S. Cl. ........................................ 712/24; 712/225
(58) Field of Classification Search ................. 712/23, 712/24, 225
See application file for complete search history.

(56) References Cited

U.S. PATENT DOCUMENTS

| | | |
|---|---|---|
| 5,805,852 A | 9/1998 | Nakanishi |
| 5,983,336 A * | 11/1999 | Sakhin et al. ................. 712/24 |
| 6,487,630 B1 * | 11/2002 | Bui ............................ 711/109 |
| 6,928,645 B1 * | 8/2005 | Wang et al. ................ 718/102 |
| 2003/0105617 A1 * | 6/2003 | Cadambi et al. .............. 703/14 |

FOREIGN PATENT DOCUMENTS

WO    WO0033178    6/2000

* cited by examiner

*Primary Examiner*—William M. Treat
(74) *Attorney, Agent, or Firm*—Adam L. Stroud

(57) ABSTRACT

A VLIW processor comprising: a plurality of functional units (1, 3); a distributed register file (4) comprising a plurality of segments (5, 7, 9), the distributed register file (4) being accessible by the functional units (1, 3); a communication unit (11) for communication with a memory; a communication network (13) for coupling the functional units (1, 3) and the distributed register file (4); characterized in that the VLIW processor further comprises a spilling device (15) for transferring data between the distributed register file (4) and the communication unit (11).

5 Claims, 1 Drawing Sheet

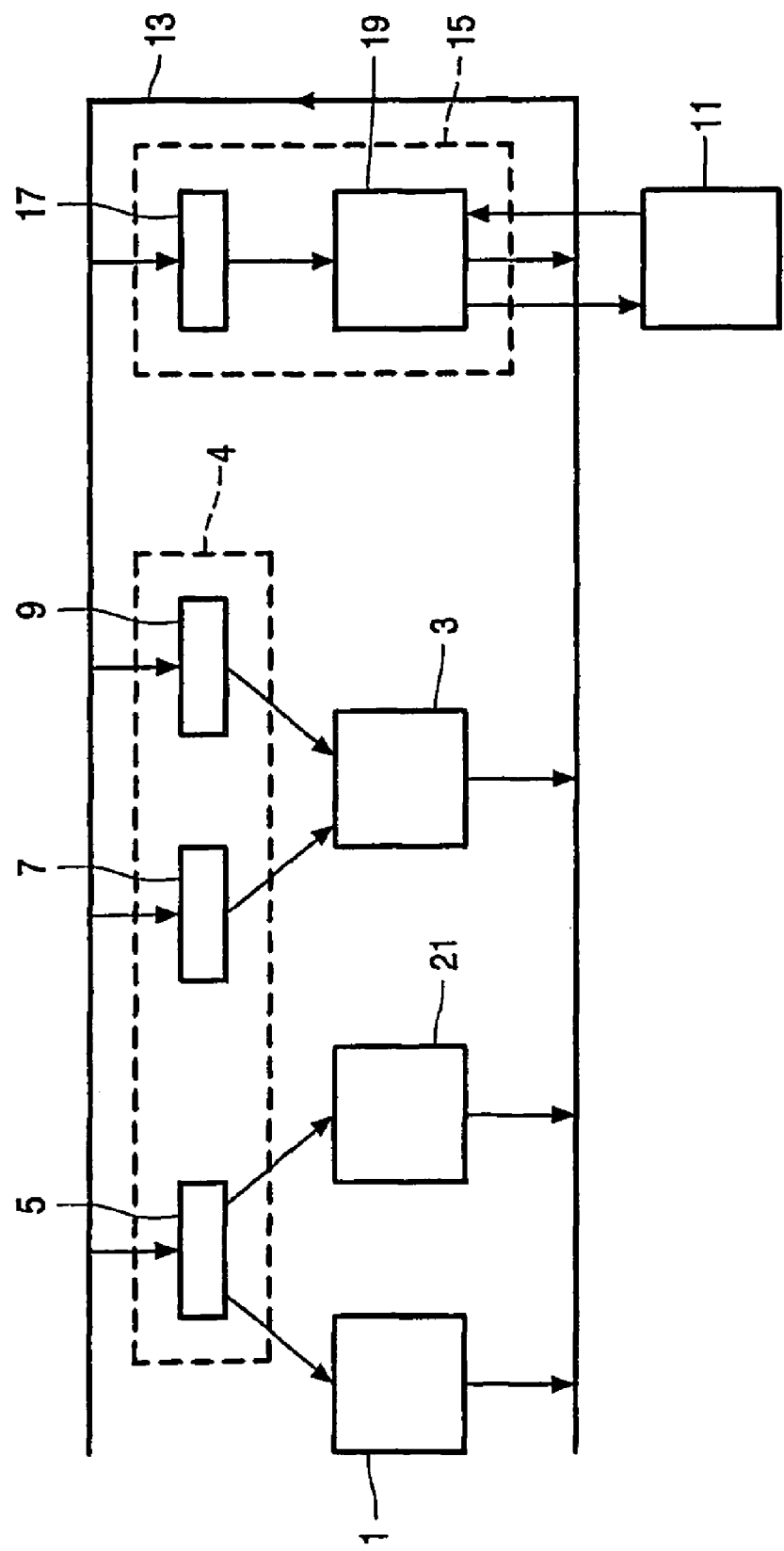

VLIW PROCESSOR WITH DATA SPILLING MEANS

TECHNICAL FIELD

The present invention relates to a VLIW processor comprising: a plurality of functional units; a distributed register file comprising a plurality of segments, the distributed register file being accessible by the functional units; a communication means for communication with a memory; a communication network for coupling the functional units and the distributed register file.

BACKGROUND ART

An embodiment of the VLIW processor of the kind set forth is disclosed in WO 00/33178.

A Very Long Instruction Word (VLIW) processor allows exploiting instruction-level parallelism in programs and thus executing more than one instruction at a time. A VLIW processor uses multiple, independent functional units to execute multiple operations in parallel. VLIW processors package multiple functional unit operations into one very long instruction.

Limitations of VLIW processing include limited hardware resources, limited parallelism and a large increase in code size. Limited hardware resources may be the functional units, the register file or the communication network. Anticipating these limitations by adding more resources has some serious drawbacks. For example, when increasing the number of functional units, the memory size and register file bandwidth will have to increase as well. Furthermore, a large number of read and write ports are necessary for accessing the register file, imposing a bandwidth that is difficult to support without a large cost in the size of the register file and degradation in clock speed.

For some applications to be run on the VLIW processor the limiting hardware resource may be the register file. A large register file could be used to prevent this. However, this has several drawbacks. First, a register file with many registers may create critical timing paths and therefore limit the cycle time of the processor. Second, as the number of directly addressable registers increases, the number of bits to specify the multiple registers within the instruction increases as well. Third, a register file with many registers occupies a large silicon area.

DISCLOSURE OF INVENTION

An object of the invention is to provide a VLIW processor architecture, which prevents the register file being the limiting hardware resource.

This object is achieved with a VLIW processor of the kind set forth characterized in that the VLIW processor further comprises spilling means for transferring data between the distributed register file and the communication means.

It is to be noted that spilling itself is known, but from a completely different field of technology, viz. from compiler technology. The principle is that when a compiler is generating machine code and there are more live variables than the machine has registers, some variables are transferred or "spilled" from registers to memory.

The spilling means have the capability to transfer values from the register file to the communication means, via the functional units. The spilling means also have the capability to restore values by transferring them from the communication means to the register file.

An embodiment of the invention is characterized in that the spilling means comprise a spill register file and a spill unit, the spill register file being accessible by the spill unit. An advantage of this embodiment is that it prevents that the speed of transferring values by the spilling means to the communication means limits the clock frequency of the processor.

An embodiment of the invention is characterized in that at least one of the segments of the distributed register file is associated with a functional unit that is unable to pass data from the segment of the distributed register file to the spilling means, a pass unit being associated with the functional unit for passing data from the segment of the distributed register file to the spilling means. In case a functional unit, such as a ROM unit, is not able to pass the value that has to be spilled from the register file, the pass unit is capable of doing so.

An embodiment of the invention is characterized in that the communication network comprises a partially connected communication network. An advantage of this embodiment is that it reduces the overhead of a fully connected network.

An embodiment of the invention is characterized in that the pass unit is part of the associated functional unit. An advantage of this embodiment is that no separate pass unit is required, saving additional silicon area and communication connections.

BRIEF DESCRIPTION OF THE DRAWING

The features of the described embodiments will be further elucidated and described with reference to the drawing:

The single FIGURE is a schematic diagram of a VLIW processor in accordance with an embodiment of the present invention.

DESCRIPTION OF PREFERRED EMBODIMENTS

Referring to the FIGURE, a schematic block diagram illustrates a VLIW processor comprising a plurality of functional units including functional units 1 and 3. The processor has a distributed register file 4 including register file segments 5, 7 and 9. The functional unit 1 can read from register file segment 5. The functional unit 3 can read from the register file segments 7 and 9.

The processor includes a communication unit 11 for communication with a memory. The latter is not shown in this FIGURE. The processor also includes a communication network 13, e.g. a bus, that couples the functional units 1 and 3, and the register file segments 5, 7 and 9.

Furthermore, the processor comprises a spilling device 15. The spilling device 15 and the register file segments 5, 7 and 9 are coupled via the communication network 13. The spilling device 15 and the functional units 1 and 3 are also coupled via the communication network 13. The spilling device 15 allows transferring values from the register file segments 5, 7 and 9 to the communication unit 11, via the functional units 1 and 3. Furthermore, the spilling device 15 can restore values by transferring them from the communication unit 11 to the register file segments 5, 7 and 9.

Preferably, the spilling device 15 comprises a spill register file 17 and a spill unit 19. The spill unit 19 can read from the spill register file 17. An advantage of this embodiment is that it prevents that the speed of transferring values by the spilling device 15 to the communication unit 11 limits the clock frequency of the processor. In some embodiments, values can be temporarily stored in the spill register file 17, without passing them to the communication unit 11. From the spill register file 17, these values can be transferred to the register file segments 5, 7 and 9 by the spill unit 19. An advantage of this embodiment is that is prevents the time consuming actions of writing to and restoring values from the communication unit 11.

In an advantageous embodiment, the processor also has a pass unit 21. The pass unit 21 can read from the register file segment 5, and the pass unit 21 and the spilling device 15 are coupled via the communication network 13. The pass unit 21 allows passing the value that has to be spilled from the register file segment 5, in case the functional unit 1 is not capable of doing so. In some embodiments multiple pass units will be present, in other embodiments none will be present. A pass unit can be associated with a functional unit if that functional unit, e.g. a ROM unit, is not capable of passing a value from a register file segment.

In the embodiment shown in this FIGURE, the pass unit 21 is a separate unit associated with functional unit 1. In some embodiments, the pass unit 21 can be part of the associated functional unit 1 by adding an additional operation to this functional unit that allows to pass a value from a register file segment.

The functional units can be coupled to one register file segment, as in case of the functional unit 1, or to multiple register file segments, as in case of the functional unit 3. The register file segments can be coupled to one functional unit or to multiple functional units. The degree of coupling between the register file segments and the functional units can depend on the type of operations that the functional unit has to perform.

The communication network 13 couples the functional units 1 and 3, and the register file segments 5, 7 and 9. The embodiment shown in this FIGURE has a fully connected communication network, which means that every functional unit 1 and 3 is coupled to every register file segment 5, 7 and 9. In some embodiments the communication network 13 is partially connected, so not every functional unit 1 and 3 is coupled to every register file segment 5, 7 and 9. An advantage of a partially connected network compared to a fully connected network is that it is less expensive in terms of silicon area and it allows for a higher clock frequency of the processor.

The functional unit 1 and 3 as well as the pass unit 21 are coupled to the spilling device 15. In the embodiment shown in this FIGURE, these couplings are part of the communication network 13. In some embodiments, one or more of these couplings may be separate.

The spilling device 15 is coupled to the register file segments 5, 7 and 9. In the embodiment shown in this FIGURE, these couplings are part of the communication network 13. In some embodiments, one or more of these couplings may be separate.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A VLIW processor comprising:
   a plurality of functional units;
   a distributed register file comprising a plurality of segments, the distributed register file being accessible by the functional units;
   communication means for communication with a memory;
   a communication network for coupling the functional units and the distributed register file;
   characterized in that the VLIW processor further comprises spilling means for transferring data between the distributed register file and the communication means.

2. A VLIW processor according to claim 1 wherein:
   the spilling means comprises a spill register file and a spill unit, the spill register file being accessible by the spill unit.

3. A VLIW processor according to claim 1 wherein:
   at least one of the segments of the distributed register file is associated with a functional unit that is unable to pass data from the segment of the distributed register file to the spilling means, a pass unit being associated with the functional unit for passing data from the segment of the distributed register file to the spilling means.

4. A VLIW processor according to claim 1 wherein:
   the communication network comprises a partially connected communication network.

5. A VLIW processor according to claim 3 wherein:
   the pass unit is part of the associated functional unit.

* * * * *